March 23, 1948.   D. J. BLOOMBERG   2,438,357
DOUBLE ROTATION TURBO DRIVE
Filed Nov. 22, 1944
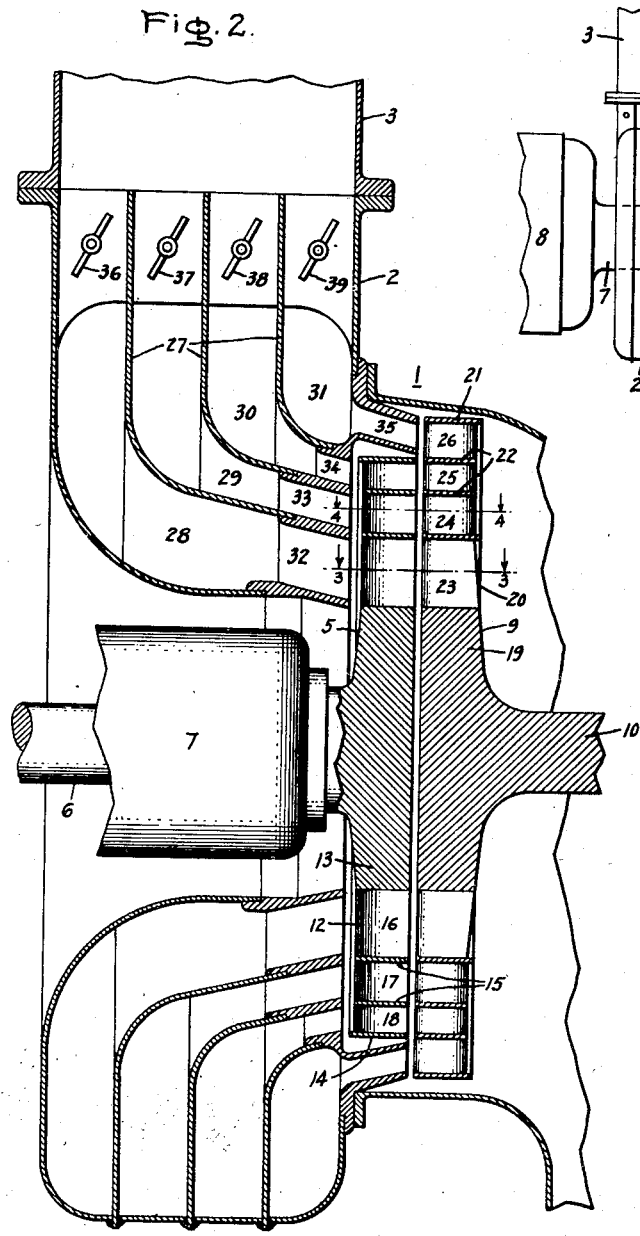
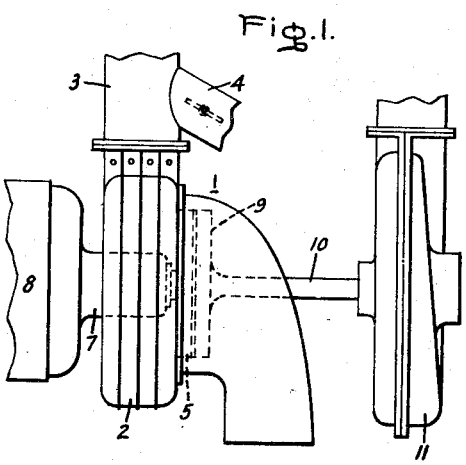
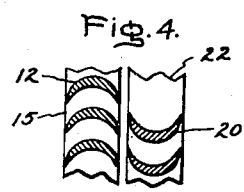
Inventor;
David J. Bloomberg,
by *Harry E. Dunham*
His Attorney.

Patented Mar. 23, 1948

2,438,357

UNITED STATES PATENT OFFICE 2,438,357

DOUBLE ROTATION TURBODRIVE

David J. Bloomberg, Newton, Mass., assignor to General Electric Company, a corporation of New York Application November 22, 1944, Serial No. 564,647

8 Claims. (Cl. 253—16.5)

1

The present invention relates to double rotation turbine arrangements in which the turbine includes two parts, a high pressure part and a low pressure part arranged in series as regards the flow of operating medium therethrough and mechanically independent of each other. Such drives are of particular interest in the form of opposed rotation turbo drives in which the two turbine parts or sections are operated at different speeds and loads and different directions of rotation. Such drives may be used advantageously in aircraft for operating superchargers, generators and other auxiliaries of aircraft power plants.

The object of my invention is to provide an improved construction and arrangement of double or dual rotation turbo drives in which the ratio of the load output of the two turbine parts or sections may be readily controlled.

For a consideration of what I believe to be novel and my invention, attention is directed to the following description and the claims appended thereto in connection with the accompanying drawing.

In the drawing, Fig. 1 illustrates a part of an aircraft power plant embodying my invention; Fig. 2 is an enlarged detail view of the turbo of Fig. 1; and Figs. 3 and 4 are sections along lines 3—3 and 4—4 respectively of Fig. 2.

The drive, as diagrammatically illustrated in Fig. 1, comprises an opposed rotation turbine 1 having a nozzle box 2, provided with an inlet conduit 3 and a waste gate 4, for conducting operating medium to a first stage bucket wheel 5 secured to a shaft 6 supported in a bearing 7 and connected to drive an electric generator 8. Operating fluid is discharged from the first stage bucket wheel to a second stage bucket wheel 9 secured to a shaft 10 for driving a centrifugal type compressor or supercharger 11. It is desirable to drive the compressor from the second stage bucket wheel, especially when used to supercharge an aircraft internal combustion engine or cabin because with increasing altitude an increasing amount of compressed air is needed and an increasing load output becomes available from the second stage wheel in view of the decreasing back pressure or altitude pressure.

According to my invention, each bucket wheel has a plurality of radially spaced bucket passage sections. More specifically, the first or high pressure wheel 5 (Fig. 2) has circumferentially spaced bucket blades 12 secured to a disk 13 fastened to, in the present example integrally formed with, an overhung portion of the shaft 6. The outer

2 ends of the wheels are covered in known manner by a shroud or band 14. Passages thus formed between adjacent buckets are subdivided by means of radially spaced, circumferentially extending partitions between adjacent buckets. In the present instance, two such partitions 15 are provided between adjacent buckets 12 of the first stage wheel, thereby forming three concentric radially spaced bucket passage sections, an inner section 16, an intermediate section 17, and an outer section 18.

The second stage bucket wheel has a disk 19 with a plurality of circumferentially spaced bucket blades 20 secured thereto and connected at their outer ends to an outer shroud or cover 21. The bucket passages are likewise subdivided by means of radially spaced partitions 22. In the present example I have shown three such partitions, thus forming four radially spaced bucket passage sections, an inner section 23, two intermediate sections 24, 25 and an outer section 26. The outer section 26 is located radially beyond the first stage buckets and the other sections 23, 24, 25 are axially aligned with the corresponding sections 16, 17, 18 of the first stage wheel to receive fluid discharged from the latter.

Means are provided for conducting operating fluid, such as exhaust gases from an internal combustion engine, to the separate sections of the first wheel and also to the outer section 26 of the second wheel. This means includes the aforementioned nozzle box 2 which is subdivided by annular walls or partitions 27 to form four nozzle box sections 28, 29, 30 and 31. These sections discharge through annular nozzle rings 32, 33, 34 and 35 respectively. The nozzle ring 32 of section 28 is arranged to direct fluid to the inner section 16 of the first stage wheel, whence the fluid is discharged to the inner section 23 of the second stage wheel. Similarly, the sections 33, 34 conduct fluid to the sections 17, 18 of the first wheel which in turn discharge fluid to the intermediate sections 24, 25 of the second wheel. The outer nozzle section or ring 35 of the nozzle box section or chamber 31 surrounds concentrically the first wheel 5 and discharges fluid directly through the outer section 26 of the second wheel. Each nozzle box section or ring extends over 360 angular degrees. The flow of fluid to the chambers 28 to 31 may be controlled by valves 36, 37, 38 and 39 respectively. By positioning these valves the flow of fluid to the separate sections of the nozzle box and the bucket passages may be readily controlled.

In a preferred embodiment one of the sections, in the present example the inner section 23 of the second wheel, has bucket blade portions 40 designed in accordance with well-known methods to have a zero turning angle. Thus when operating under the normal design conditions the fluid discharged from the section 16 is not turned in its direction of flow as it passes through sections 23 of the second wheel. Hence no energy is extracted by the section 23. All other sections of the buckets are conventional and essentially crescent-shaped, as indicated, with regard to the bucket passage sections 16, 17, 18 and 24, 25, 26 in Figs. 3 and 4 respectively.

If it is desired to reduce the total load output of the turbine, waste gate 4 is opened to discharge an increasing amount of fluid directly to atmosphere and, vice-versa, if an increased total load output of the turbine is desired, the valve gate 4 is moved toward closing position. The ratio of the load output of the two wheels is controlled by the positioning of the valves 36, 37, 38, 39. Full opening of the valve 36 increases the load output of the first wheel without materially affecting the load output of the second wheel because of the particular shape of the buckets forming the inner bucket passages 23 of the latter. Similarly, opening of the valve 39 increases the load output of the second wheel only because the fluid discharged through the nozzle ring 35 is bypassed with regard to the first wheel. Thus, during high altitude operation valve 39 may be fully opened and valve 36 closed in order to obtain maximum load output from the second wheel needed for operating the compressor 11 at high altitude. Conversely, valve 36 is fully opened and valve 39 is closed at low altitude operation when less supercharging by the compressor 11 is needed.

Thus, with my invention I have accomplished an improved construction and arrangement of exhaust gas-operated turbines in which the nozzle ring of the supply box and the bucket passages of two mechanically independent bucket wheels are sectionalized to permit at a constant weight flow of fluid, a better control of the pressure drop across the turbine, and a desired load distribution between the two wheels. Generally the two wheels each have a bucket annulus, connected in series with each other, and each wheel has another separate annulus for directly receiving fluid from the nozzle box, which fluid is either bypassed with regard to the other wheel or, if passed therethrough, does not materially affect the output thereof.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A dual rotation fluid pressure turbine comprising a first wheel having concentric inner and outer bucket passage sections, a second mechanically independent wheel having concentric inner, intermediate and outer sections, the inner and intermediate sections of the second wheel being arranged to receive fluid discharged from the inner and outer sections of the first wheel respectively, means for conducting operating fluid to the first wheel, and other means for bypassing fluid around the first wheel and conducting it directly to the outer section of the second wheel, the inner section of the second wheel having bucket blades shaped so as to extract substantially no energy from the operating fluid under normal operating conditions.

2. A dual rotation fluid pressure turbine comprising a first wheel having concentric inner and outer bucket passage sections, a second coaxial mechanically independent wheel having inner, intermediate and outer sections, the inner and intermediate sections of the second wheel being arranged to receive fluid discharged from the respective sections of the first wheel, means for conducting operating fluid to the first wheel, other means for bypassing operating fluid around the first wheel and conducting it directly to the outer section of the second wheel, the inner section of the second wheel having bucket blades acting as guides for the fluid discharged from the inner section of the first wheel without extracting any substantial amount of energy from said fluid, and means for controlling the flow of operating fluid to the respective sections of the first wheel and to the outer section of the second wheel.

3. A dual rotation fluid pressure turbine comprising a first wheel having a plurality of concentric bucket sections, a second wheel mechanically independent from and coaxial with the first wheel and having a plurality of concentric bucket sections aligned with the respective sections of the first wheel, said second wheel having another concentric bucket section located radially beyond the outer circumference of the first wheel, a nozzle box having a plurality of concentric radially spaced nozzle arcs for conducting operating fluid to the first wheel and another nozzle arc concentrically surrounding the first wheel for bypassing operating fluid around the first wheel and conducting it to the outer section of the second wheel, and valve means for controlling the flow of fluid to the several nozzle arcs, one of the aligned bucket sections of the two wheels having blades designed to have zero turning angles so as to act as guides for fluid flowing therethrough without extracting any substantial amount of energy therefrom.

4. A multi-stage dual rotation fluid pressure turbine including two coaxial mechanically independent rotors forming a first and a second stage respectively, a partitioned nozzle box, and control means for selectively supplying operating fluid to the second stage only and to both stages in series flow relation, the second stage having a bucket annulus circumferentially divided into concentric inner and outer radially spaced portions, the inner one of which has blades shaped to present minimum resistance to flow whereby operating fluid flows therebetween with substantially no delivery of energy to said blades.

5. A multi-stage dual rotation fluid pressure turbine having two coaxial mechanically independent first and second stage rotors, a nozzle box with partitions arranged to form a plurality of concentric radially spaced nozzle annuli, one of which is arranged to deliver fluid to the second stage rotor only and another of which is arranged to deliver fluid to both rotors in series flow relation, the second stage rotor having separate inner and outer radially spaced concentric bucket annuli, an inner one of which has blades defining a flow path through which the operating fluid normally passes without giving up any substantial amount of energy to said blades.

6. In an axial flow dual rotation turbine, the combination of a first bucket wheel, a second bucket wheel immediately adjacent and coaxial with and mechanically independent of the first wheel, a nozzle box for supplying motive fluid to said wheels in series flow relation, said nozzle box defining a plurality of separate concentric radially spaced nozzle arcs including an outermost arc arranged to bypass fluid around the first wheel and deliver it directly to said second wheel, and valve means for selectively controlling the flow of operating fluid to said separate nozzle arcs, said first wheel having a plurality of separate radially spaced concentric bucket annuli each arranged to receive fluid from a separate nozzle arc, said second wheel having a plurality of separate radially spaced concentric bucket annuli including one radially beyond the outer circumference of the first wheel and arranged to receive fluid bypassed around the first wheel by said outermost nozzle arc, at least one of said bucket annuli on the second wheel radially inward from the outermost annulus having blades so shaped that substantially no energy is transferred from the fluid to said blades under normal operating conditions.

7. In an axial flow dual rotation turbine, the combination of a first bucket wheel having a plurality of radially spaced concentric bucket annuli, a second coaxial mechanically independent wheel having a plurality of radially spaced concentric bucket annuli, a nozzle box arranged to supply motive fluid to said first wheel and having a plurality of radially spaced concentric nozzle arcs, and valve means for selectively controlling the flow of operating fluid to said separate nozzle arcs, one of the wheels having an outermost bucket annulus radially beyond the circumference of the other wheel, said last-mentioned wheel also having a radially inner bucket annulus with blades shaped so as to extract substantially no energy from the fluid at normal operating conditions, the outermost arc of the nozzle box being arranged to supply fluid to said outermost bucket annulus only and the other nozzle arcs being arranged to supply fluid to the other bucket annuli of the first and second wheels in series flow relation.

8. In an axial flow dual rotation turbine, the combination of a first bucket wheel having a plurality of radially spaced concentric bucket annuli, a second wheel coaxial with and mechanically independent of the first wheel and having a plurality of radially spaced concentric bucket annuli, a nozzle box arranged to supply motive fluid to said first wheel and having a plurality of radially spaced concentric nozzle arcs, one of said wheels having an outermost bucket annulus radially beyond the circumference of the other wheel and having also another radially inner bucket annulus with blades shaped so as to extract substantially no energy from the fluid at normal operating conditions, said nozzle box having an outermost arc arranged to supply fluid to said outermost bucket annulus only and at least one radially inner arc arranged to supply fluid to the first and second wheels in series flow relation, and valve means for selectively controlling the flow of operating fluid to said separate nozzle arcs.

DAVID J. BLOOMBERG.

REFERENCES CITED

The following references are of record in the file of this patent:

UNITED STATES PATENTS

| Number | Name | Date |
| --- | --- | --- |
| Re. 15,092 | Baumann | Apr. 26, 1921 |
| 745,575 | Curtis | Dec. 1, 1903 |
| 750,316 | Stumpf | Jan. 26, 1904 |
| 766,293 | Stumpf | Aug. 2, 1904 |
| 1,102,357 | Schmidt | July 7, 1914 |
| 2,188,546 | Thiesen | Jan. 30, 1940 |

FOREIGN PATENTS

| Number | Country | Date |
| --- | --- | --- |
| 112,271 | Switzerland | Oct. 16, 1925 |